United States Patent [19]
Tranquilla et al.

[11] 3,992,931
[45] Nov. 23, 1976

[54] BEARING TRANSDUCER ASSEMBLY

[75] Inventors: Michael Nicholas Tranquilla, Elmhurst; Prakash Dhirubhai Desai, Palatine, both of Ill.

[73] Assignee: Union Special Corporation, Chicago, Ill.

[22] Filed: Jan. 26, 1976

[21] Appl. No.: 652,266

[52] U.S. Cl. ............................. 73/133 R; 73/465
[51] Int. Cl.² ........................................ G01L 5/00
[58] Field of Search ........... 73/133 R, 140, 66, 460, 73/462, 465

[56] References Cited
UNITED STATES PATENTS
2,461,645  2/1949  Kallmann ..................... 73/465
FOREIGN PATENTS OR APPLICATIONS
198,732  6/1967  U.S.S.R. ..................... 73/133 R Primary Examiner—Jerry W. Myracle
Attorney, Agent, or Firm—John W. Harbst; John A. Schaerli

[57] ABSTRACT

A bearing transducer assembly for measuring the dynamic load applied to a bearing by an oscillating or rotating member. The apparatus includes a shaft journaled within a thin walled bearing, a support member, a plurality of transducer assemblies mounted between the support member and the bearing for supporting the bearing and shaft and for detecting the dynamic load placed thereupon by the oscillation or rotation of the shaft, and an electrical circuitry for cancelling the bearing distortion components and measuring the dynamic load component representative of the dynamic load applied to the bearing.

13 Claims, 8 Drawing Figures

BEARING TRANSDUCER ASSEMBLY

This invention relates to transducer assemblies, more particularly it relates to bearing transducer assemblies which measure dynamic loads that are placed upon a bearing by an oscillating member.

There have been numerous devices designed to measure the forces created by an improperly balanced rotating body or shaft. These devices utilize transducer assemblies carried by bearing supports located at each end of the rotating body or shaft. Some of these devices have utilized strain gage transducer assemblies for measuring the imbalance forces of the rotating body or shaft, while others have employed piezoelectric bearing transducer assemblies for measuring the imbalance forces created by the imbalanced rotating body or shaft.

Because of the high speeds of today's machines most shafts are journaled within bearings or bushings. These bearings or bushings usually have oil clearances surrounding the shaft thereby allowing for the attainment of high speeds, the oil clearances serving to lubricate and thereby alleviate the heat buildup. It should be noted, however, when an eccentric driving mechanism is affixed to the rotating shaft for delivering a driving force to a linkage connected thereto that there will be dynamic loads applied to the bearing or bushing. The dynamic load applied to the bearing is a summation of a number of forces. These forces are imbalance forces which are caused by the imbalance of the eccentric driving mechanism. The forces created by this imbalance are first harmonic forces. A second force, referred to as impact forces, are quickly varying forces that change the magnitude of the imbalance force is a non-sinusoidal manner within one revolution of the shaft. These impact forces are high harmonic forces that have a very short rise time, that is approximately a fraction of the time it takes for the shaft to make one revolution. These impact forces are caused when the inertia forces of the driven link reverse direction thereby forceably moving the shaft across the bearing oil clearance. When measuring the dynamic loads applied to a bearing or bushing it is also necessary to take into account the bearings deformation which will also cause a spurious output to be produced by the transducer assemblies. Thus, to achieve a correct reading of the forces applied to a bearing, the deformation of the bearing needs to be cancelled thereby yielding a measurement of only the dynamic load created upon the bearing or bushing in a single plane.

A piezoelectric bearing transducer assembly, useful for determing the condition of balance in a rotating body, is shown in U.S. Pat. No. 1,599,922 issued to T. C. Rathbone, dated Sept. 14, 1926. Devices of this sort have been utilized for measuring the amount of imbalance in a rotating body. However, they are capable of measuring only first harmonic forces produced by the shaft on the bearing. The electrical circuitry associated therewith eliminates or filters our any higher harmonic forces that are produced upon the bearing by the shaft. Whereas with the present embodiment all of the forces applied to the bearing or bushing as well as the bearing information are taken into account and are effectively measured.

SUMMARY OF THE INVENTION

While the invention will be described in connection with a testing model it should be apprciated that the concept theory of the device lends itself to be used within tightly toleranced areas or it may be used in larger applications. An example of larger applications might be to measure the dynamic load of a generator shaft journaled at both ends by bearings. An example of a tightly toleranced area would be the bushing support members located within the frame of a machine. These supports need only to be machined out and added $\frac{1}{16}$ to 3/16 of an inch clearance surrounding the outside diameter of the bearing or bushing, thereby allowing adequate clearance for the insertion of a compact version of the transducer assembly disclosed in the present invention. It should also be appreciated that the device is not only capable of measuring the dynamic loads created by an oscillating member but this device is capable of lending itself to applications where the dynamic load of a rotating shaft or a translating shaft desire to be measured. The improperly balanced shaft shown in the present invention may be equated to any shaft suitably supported in a machine having a mechanism affixed thereto.

The embodiment shown discloses a piezoelectric transducer assembly but it should be understood that any suitable transducer means such as differential transformer means, strain gage means, etc., could be utilized for detecting the dynamic load applied to the bearing. In view of the foregoing, and in accordance with the present invention there has been developed a piezoelectric bearing transducer assembly for analyzing and mesuring the dynamic loads that are placed upon a bearing or bushing by an eccentric driving mechanism. The present invention provides the means for directly measuring forces, ranging from the first harmonic to 500 harmonics above the fundamental machine frequency, that are placed upon bearings or bushings within the machines. It should be noted that there is a correlation between the noise decibels produced by a machine and the high harmonic forces that are placed upon a bearing by an oscillating member. Therefore there is provided by the present invention the means having the capability of comparing the noise potential of different mechanisms. An example of the invention hereunder consideration is employed in conjunction with an improperly balanced rotating shaft journaled within a bearing or bushing. The rotating shaft and the bearing or bushing are both totally supported by two pairs of minute piezoelectric transducer assemblies. The bushing or bearing is carried by a support means which is located at each end of the rotating shaft. As the shaft is rotated a force vector representing the imbalance force is applied in a sinusoidal manner to the piezoelectric transducer assemblies supporting the bearing, this is caused due to the eccentricity of the mechanism. As the eccenctric mechanism drives the link, impact forces will also occur upon the bearing much more rapidly than does the imbalance force during one revolution of the shaft. These impact forces, that is the higher harmonic forces, occur due to the inertia reversal of the driven link member thereby forceably driving the shaft across the bearing oil clearance. Both the imbalance force and the quickly varying impact forces are directly picked up by the pairs of piezoelectric transducer assemblies totally supporting the bearing and shaft. It is well known in the art that the piezoelectric transducer assemblies convert the forces applied thereto into electrical charges the magnitudes of which is proportional to the force applied to the assembly. These charges are developed by means of piezoelectric cyrstals which are contained within each set of piezoelectric transducer assemblies. Each pair or set of transducer assemblies is connected to a unique electrical circuitry whereby the component vector associated with the bearing distortion is taken into account and completely cancelled. Once the component vector associated with the distortion of the bearing is cancelled the remaining forces, that is, the imbalance force and the impact force, which are now converted into electrical charges by the piezoelectric crystals are analyzed and show up as wave forms on the face of an oscilliscope. By analysis of these wave forms it is possible to compare the dynamic loads developed by similar mechanisms thereby determing which mechanism would be best to utilize.

In view of the foregoing, the present invention has for an object to provide a bearing transducer assembly that can directly measure the dynamic loads placed upon a bearing or bushing by a mechanism.

Another object of the invention is to provide means to obtain a better resolution of reaction forces in a wide range of frequencies associated with the audible spectrum.

Still another object of this invention is to provide a method for obtaining a quantitative understanding of the effects of clearance in lubrication of the transmitted force.

Yet another object of the invention is to provide means which have the capability of measuring large ranges of forces in a linear fashion.

Still another object of the invention is to provide a means having the ability of locating and ranking those bushings or bearings which produce the most noise.

Another object of this invention is to provide a means which is compact, therefore capable of being used on small bearings or bushings within tight space requirements.

With the above and other objects in view that will hereinafter appear, the nature of the invention will be more clearly understood by reference to the following detailed description, the appended claims and in several views illustrated in the accompanying drawings.

DESCRIPTION OF THE PREFERRED EMBODIMENT

Figure 1:
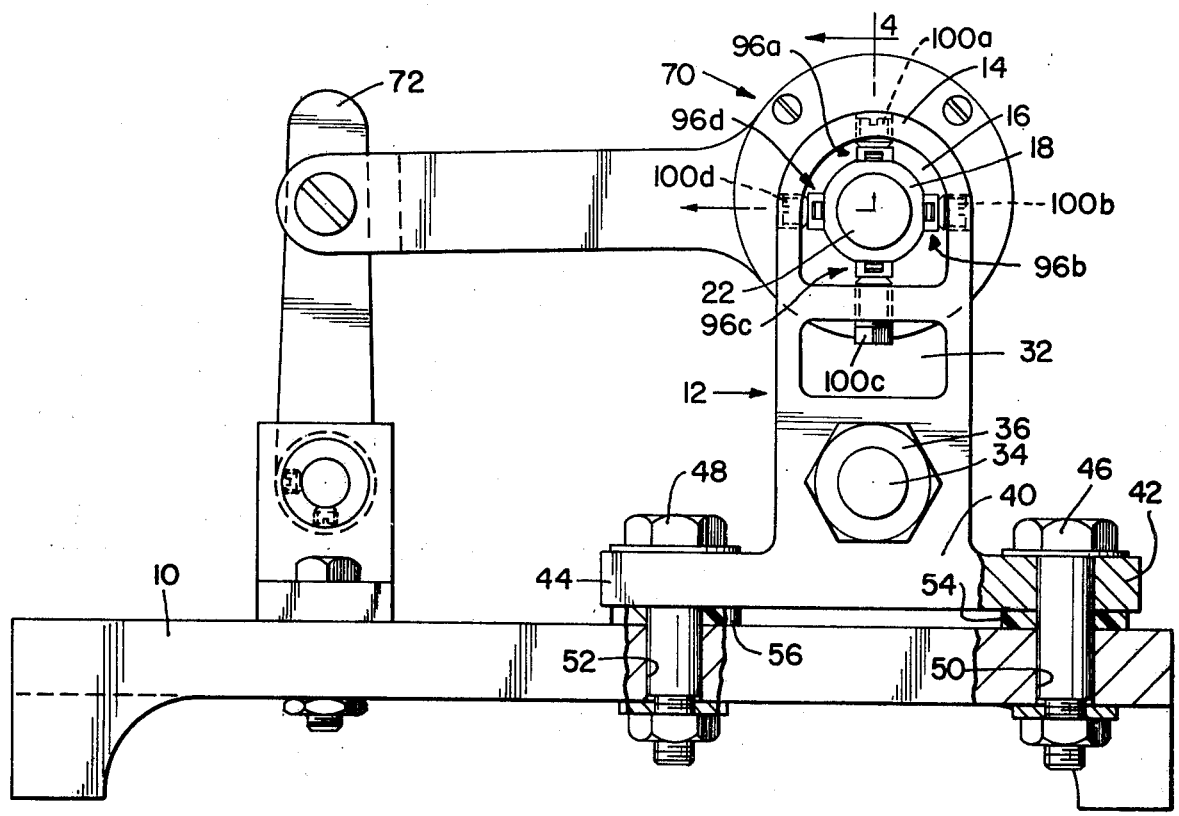
FIG. 1 is a side elevation view of a piezoelectric bearing transducer assembly totally supporting an imbalanced member for rotation, the transducer assembly being secured in a testing stand part of which is partially broken away.
Figure 1A:
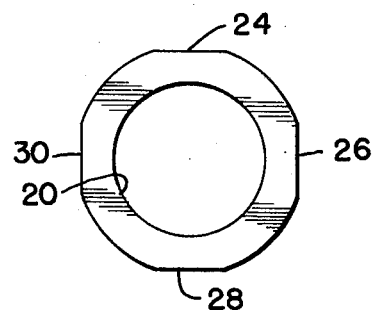
FIG. 1a is an enlarged view of the small thin walled bearing with four equally spaced flats thereon.

It should be noted that the embodiment shown in the drawings is only a test model and is shown for purposes of explanation. Keeping in mind, that in actual practice the piezoelectric transducer assemblies would be mounted in the bearing support members of the machine. Referring now to the drawings and more particularly to FIGS. 1 and 1a wherein is shown a frame 10 which has secured thereto a support member 12. The support member 12 has at its upper end 14 a first aperture means 16. Carried therein is a thin walled bearing 18 which may be in the form of a solid bronze bushing. In the preferred embodiment the solid thin walled bearing means is formed of a strong metal, preferably Mueller bronze or its equivalent, for two reasons: one, since the bearings utilized within the framework of machines are preferably of thin walled construction utilization of such bearings in the present application lends itself to the physical constraints of actual applications; secondly, the thin walled construction reduces to a minimum the diameter of the bearing thereby lessening the inertia forces created by the bearing. The thin walled bearing 18 is formed with the bore means 20 wherein the imbalanced rotating shaft 22 is journaled when the piezoelectric transducer assembly is assembled in working order. The bearing means shown in FIG. 1a has on its periphery four flat surfaces namely 24, 26, 28 and 30. These flat surfaces are spaced approximately 90° apart from one another for reasons discussed hereinafter.

Medially located on the support member 12 is a second aperture means 32. As will be discussed hereinafter there is a compressive force applied equally to each of the piezoelectric transducer assemblies through the compressive screws 100a, 100b, 100c, and 100d. The provision of the aperture means 32 in the support member 12 thereby allows adequate room for the adjustment of the compressive screw 100c. Beneath the second aperture means 32 the support member 12 is in engagement with threaded rod 34. Nut means 36 and 38 (FIG. 2) are threaded thereupon and serve as dampering members to any vibrations which may result within the supporting member 12. Supporting member 12 has provided at its lower end 40 two laterally projecting sections 42 and 44. These two projections serve to secure support member 12 to the frame 10. Nut and bolt assembly means 46 and 48 are journaled within slots 50 and 52 (FIG. 3) and are employed to secure the supporting member 12 to the frame 10. Between the supporting member 12 and the frame 10 there are disposed vibration dampening means 54 and 56 which will absorb any vibrations which may result from the frame 10.

Figure 2:
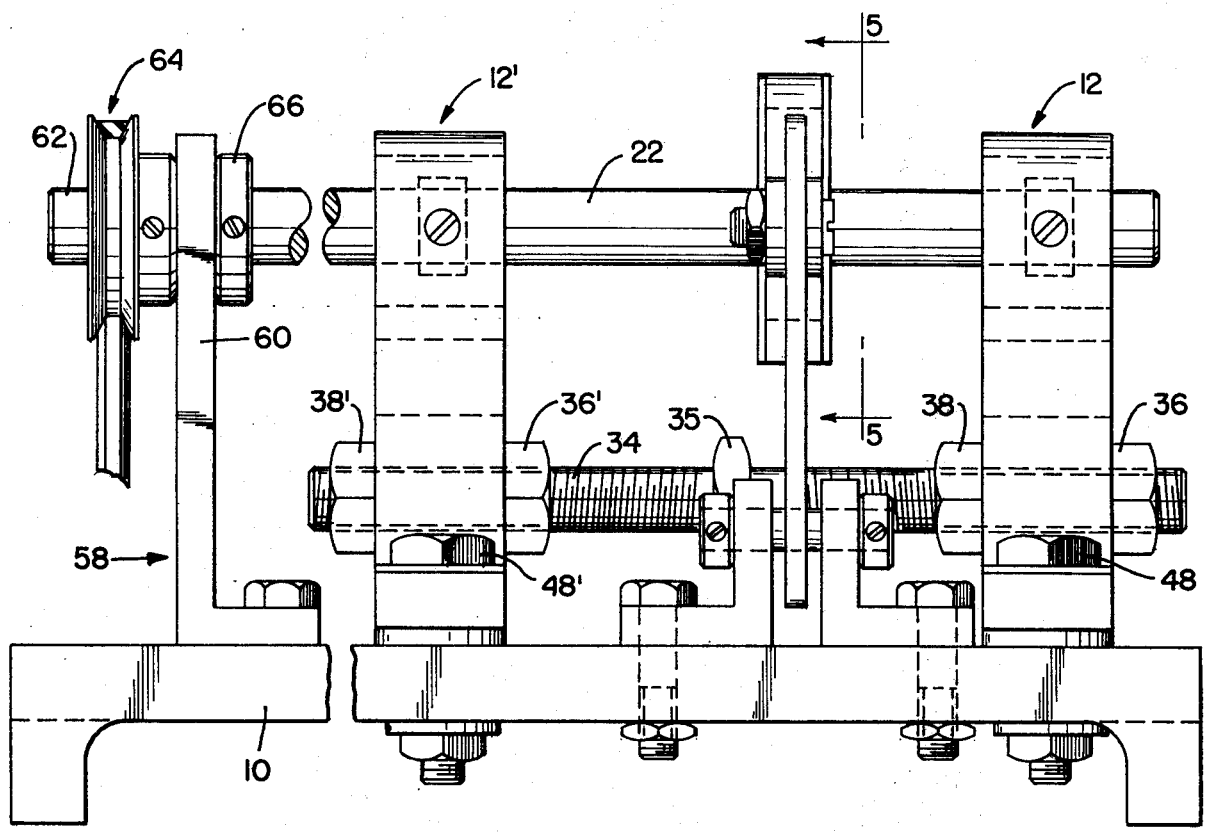
FIG. 2 is a front elevation view illustrating how the imbalance shaft is supported by two adjustable support members comprising part of the test stand.
Figure 3:
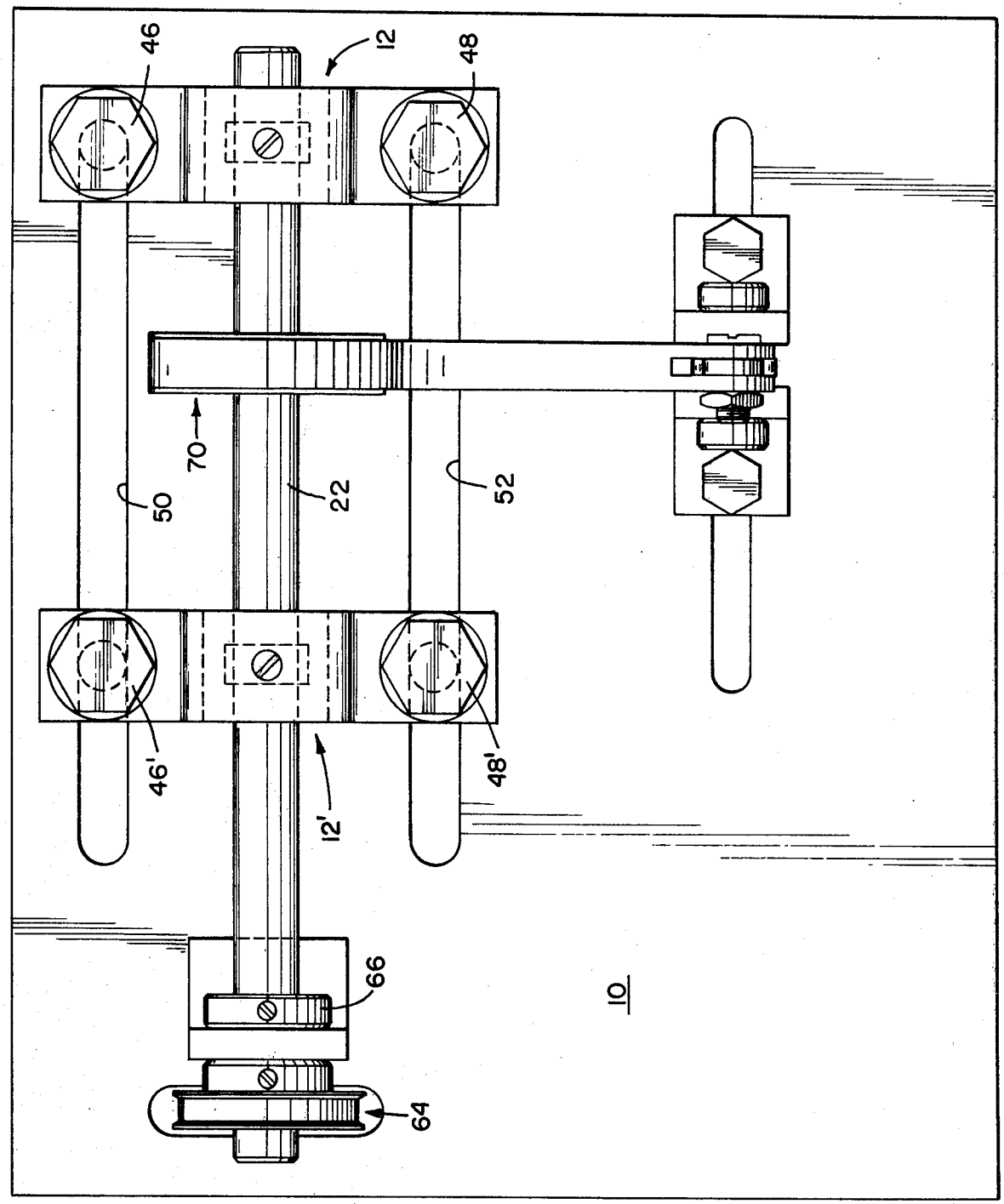
FIG. 3 is a top plane view of the testing stand.

As can be seen in viewing FIG. 2 there is provided a horizontal and vertical support member 58 which is secured in a conventional manner to the frame 10. An upwardly extending leg 60 of support member 58 provides a supporting means for the first end 62 of shaft 22. Leg 60 also helps to negate any horizontal thrusts which the shaft 22 may be subjected to. Mounted upon shaft 22 there is provided, on the immediate left side of leg 60, a force transfer means 64. The force transfer means 64 is fixedly attached to the shaft 22 in a conventional manner and confines any lateral movement of the shaft 22 to the right as viewed in FIG. 2. Conventional means (not shown) are provided for delivering rotational movement to shaft 22 through the force transfer means 64. Collar 66, affixed in a conventional manner to shaft 22, confines lateral movement of the shaft 22 in the remaining horizontal direction. As can also be seen in FIGS. 2 and 3 there is a second support member 12' which is identical in design and character to support member 12. The threaded rod 34 is threadably engaged with support member 12 and support member 12'. The threaded rod 34 has a left handed thread along approximately half its length and a right handed thread on the remaining portion of its length. Medially located along its length, threaded rod 34 has nut means 35 formed as an integral part thereof. By undoing the locking engagement of nut means 36 and 38 along with nut means 36' and 38' from contact with their support members 12 and 12' respectively, and by loosening both nut and bolt assembly means 46, 48, and 46', 48', the support members 12 and 12' are able to move towards or away from one another. The movement of the supporting members being dependent upon the clockwise or counter-clockwise movement imposed onto nut means 35. As is best viewed in FIGS. 1 and 3 the supporting members 12 and 12' are confined within the lateral limits of the slots 50 and 52 formed in the frame 10.

Figure 5:
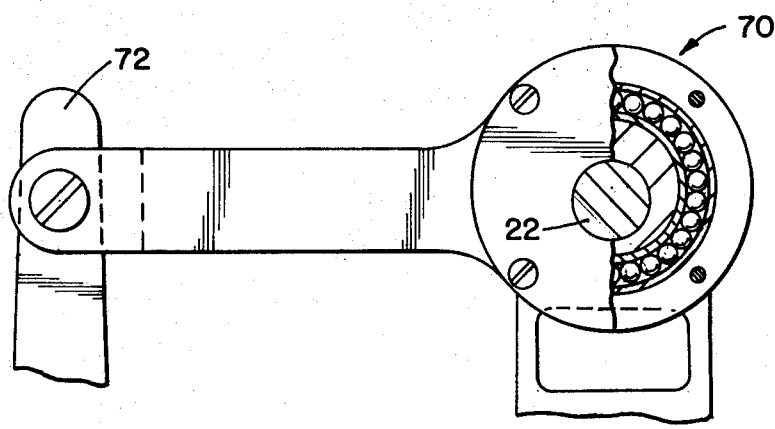
FIG. 5 is a partial cross sectional view taken substantially along line 5—5 of FIG. 2.

As can be best seen in FIGS. 1, 2 and 5 and as mentioned above, the shaft 22 is journalled for rotation or oscillation within the thin walled bearing or bushing 18. The shaft has affixed thereto a dynamic load generating means generally indicated as 70 in the drawings. The dynamic load generating means shown in the drawings is only one embodiment of a eccentric driving device affixed to a shaft which will produce both impact and imbalance forces. It should be appreciated that the shaft 22 is representative of any of a number of shafts located throughout the machine which produce noise due to their rotation, oscillation, or translation. The dynamic load generating means shown in the drawings is connected to a drive member generally indicated as 72. Once again it should be pointed out that the driven member may take many different forms depending upon the operation of the machine. Two examples of the form that the driven member may take are, a crankshaft in an automobile engine, or a feed bar mechanism in a sewing machine, both of which are forceably driven during the operation of the machine.

Because of the improperly balanced body, namely the impact generating means 70, being affixed to the shaft, upon rotation of the shaft the imbalance force vector associated with the imbalance force will cause the shaft to ride on the inside diameter of the bearing. This imbalance force vector is applied in a sinusoidal manner to each of the piezoelectric transducer assemblies during one revolution of the shaft. The impact force vector is that which results when the shaft forceably moves across the bearing oil clearance and slams into the bearing thereby causing an impact force to be applied to the bearing. This impact force vector changes the sinusoidal wave form of the imbalance force into a non-sinusoidal wave form. The impact forces which are placed upon the thin walled bearing 18 are what generates almost all of the noise in the machines. By equating these impact forces of high harmonic forces with the audible spectrum it will be possible to obtain a quantitative understanding of the effects of the clearance in lubrication of the transmitted force.

The spectrum of the impact forces are expected to contain frequencies which are as high as 500 harmonics above the fundamental machine frequencies. The amplitudes of these high frequencies are expected to be quite low. These low amplitudes is the reason for utilizing a piezoelectric type transducer assembly. An advantage in utilizing this type transducer is that about a 10 volt charge can be developed per pound of force applied to the piezoelectric crystal. Since the impact force has such a low magnitude, it is obvious why this type transducer is employed. Another advantage in using piezoelectric tranducer assemblies is the fact that the piezoelectric crystals can be reused in different bearing assemblies. It is a further advantage of piezoelectric crystals to respond to the forces applied thereto in a linear fashion.

Utilization of piezoelectric transducers does have a disadvantage. The disadvantage being that they are difficult to mount properly. To overcome this disadvantage, four flat surfaces 24, 26, 28 and 30 have been accurately machined on the small thin walled bearing or bushing 18 as can be best seen in FIGS. 1 and 1a. The provision of the four flat surfaces on the bearing periphery provide for a mounting base for the four piezoelectric transducer assemblies 96a, 96b, 96c, and 96d. Threaded within the support member 12 are compressive screws 100a, 100b, 100c, and 100d. Each of these compressive screws are in a plane which is perpendicular to the corresponding flat surface on the small thin walled bearing or bushing. These compressive screws provide a means for directing a compressive force on each of the piezoelectric transducer assemblies 96a, 96b, 96c, and 96d. By providing a means for directing a compressive force perpendicular to the flat surface and thereby perpendicular to the piezoelectric transducer assembly mounted thereon the chances of cracking the piezoelectric crystal contained within the transducer assembly is greatly lessened. Along with that, the compressive screws hold the transducer means in place during periods of inactivity.

Figure 4A:
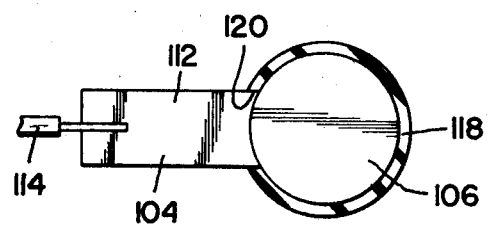
FIG. 4a is a partial top view taken substantially along line 4a—4a of FIG. 4.
Figure 4:
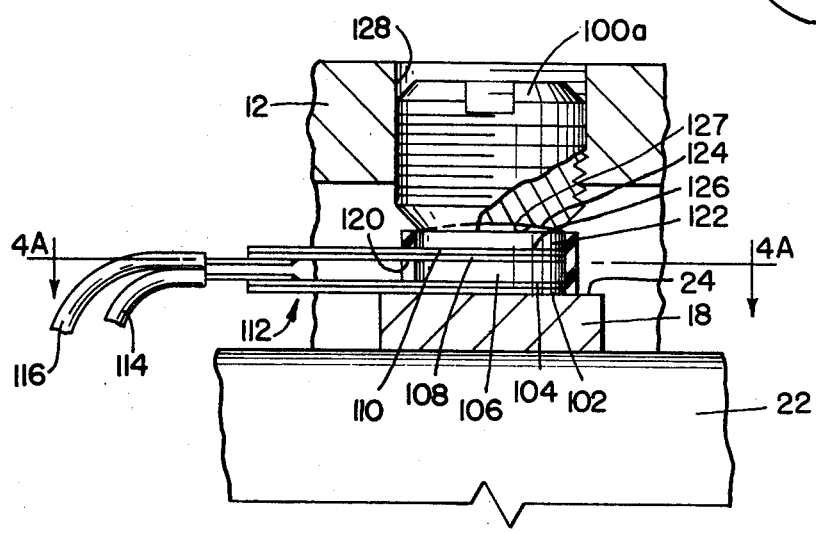
FIG. 4 is an enlarged cross sectional view taken substantially along line 4—4 of FIG. 1.

As may be best seen in FIG. 4 the parts which comprise the piezoelectric transducer assembly will now be described. For purposes of this discussion, only piezoelectric transducer assembly means 96a will be discussed but it should be noted that all of the assemblies are the same. As mentioned earlier, the shaft 22 is journaled within the thin alled bearing 18 with the flat surfaces 24, 26, 28 and 30 being arranged perpendicular to their corresponding compressive screws which are in threaded engagement with the support member 12. As non-conducting tab means 102 is placed on top of the flat surface 24 of the thin walled bearing or bushing 18. Placed on top of the non-conducting tab means 102 is the first of two conducting electrodes 104. On top of the conducting electrode 104 is placed the piezoelectric crystal 106. The second of two conducting electrodes 108 is placed over the crystal 106. Another non-conducting tab means 110 is placed on top of the second conducting electrode 108 thereby insulating the transducer assembly from the compressive screw 100a and from the support member 12 and also the thin walled bearing or bushing 18. It should be noted from FIG. 4a that the conducting electrodes 104 and 108 as well as the insulating tabs 102 and 110 all have a laterally extending portion shown as 112 in FIG. 4a. The purpose of the laterally extending portion 112 is to allow for the connection of electrical wires 114 and 116 to the conducting electrodes 104 and 110. The electrical wires 114 and 116 comprise part of an electrical circuitry which will be described below. To further insulate the small piezoelectric transducer assembly 96a there is provided yet another insulating member 118. The insulating member 118 is of a generally circular construction and it encompasses the tabs 102, 104, 108, and 110 along with the crystal 106. The periphery of the insulating member 118 has provided thereon a vertical slot 120 which allows for passage of the laterally extending portions 112 of the conducting and non-conducting tabs. The insulating member 118 not only serves for purposes of insulation, it also helps to orientate the corresponding parts assembly in the correct vertical orientation thereby helping to prevent any possible breakage of the piezoelectric crystal 106.

Turning again to FIG. 4, there is provided a force alignment means. The parts comprising the force alignment means will now be described. A shoe 122 is placed on top of the second non-conducting tab 110. The shoe 122 is provided with a convex surface on its upper surface 124 while the lower surface 126 is flat. As mentioned earlier, there is provided a compressive screw 110a employed to furnish a compressive force on the piezoelectric bearing assembly 96a. The lower end of the compressive screw 100a is provided with a concave surface 127 which cooperates with the convex surface 124 of the shoe 122.

The threaded bore 128 is precisely machined within the support member 12 in order to maintain as close as possible a perpendicular arrangement between the compressive screw 100a and the flat surface 24 on the small thin walled bearing or bushing 18. However, in machining these areas the chances of the compressive screw 100a not being exactly perpendicular to the flat surface 24 is still present. It should be noted that piezoelectric crystals are comprised of a ceramic type material which is extremely brittle and very subjective to breakage. When the transducer assembly is compressed, by exerting a compressive force through the screw 100a, arrangement of the piezoelectric crystal 106 is critical. If a perpendicular state does not exist between the compressive force and the flat surface of the small thin walled bearing the crystal will crack. Even though it is a characteristic of piezoelectric crystals to produce the same results whether they are cracked or not, it is preferable not to crack them. For this reason the force alignment means described above has been provided thereby allowing any minor misalignment which may occur between the flat surface of the small thin walled bearing and the compressive force.

All of the piezoelectric transducer assemblies are subjected to a preload compressive stress thereby holding them in constant contact with the thin walled bearing. Any well known calibrating means may be employed to adjust each of the compressive screws thereby assuring that an equal preload compressive stress is applied equally to each of the transducer assemblies. The magnitude of the preload compressive stress is dependent upon the ceramic properties of the piezoelectric crystal and the expected maximum loads which will be produced by the dynamic load generating means. It is a further characteristic of piezoelectric crystals to produce a voltage or charge which is proportional to its deformation. It should be kept in mind that the dynamic load applied to the piezoelectric transducer assemblies by the balanced shaft is comprised of a plurality of forces. At any given time both the impact and imbalance force apply a compressive stress to the piezoelectric transducer assemblies. Therefore the preload compressive stress applied equally to each compressive screw is of such a magnitude that it allows for the compression of the piezoelectric crystals by first, the imbalanced force and then very slight further compression by the impact force.

The piezoelectric transducer assemblies cooperate in pairs to obtain the vertical and horizontal components of the dynamic load applied to the bearing or bushing. More specifically, piezoelectric transducer assemblies 96a and 96c cooperate as one pair or set to obtain that component of the dynamic load placed upon the bearing in the vertical plane while the piezoelectric transducer assemblies 96b and 96d cooperate as another pair or set to obtain the component of the dynamic load placed upon the bearing in the horizontal plane. If the dynamic load applied to the bearings is neither totally directed in the horizontal or X axis plane or non-directed totally in the vertical or Y axis plane then the X and Y components which comprise that load are directly picked up by both pairs or sets of transducer assemblies and then analyzed as will hereinafter be discussed.

The devices that have been heretofore known, including the device disclosed in U.S. Pat. No. 1,599,922, have not been sensitive enough nor have they had the electrical circuitry associated therewith which is capable of cancelling bearing distortion and measuring the dynamic loads created by an oscillating or rotating shaft. For that reason there is provided by the present invention a unique electrical circuitry, which is associated with the above described mechanical aspects of the invention which is capable of measuring both low and high harmonic forces applied to a bearing or bushing by an oscillating or rotating member. This electrical circuitry also has the unique capability of taking into account varying distortion and cancelling the same thereby yielding a true reading of the dynamic load which is applied to the bearing.

Figure 6:
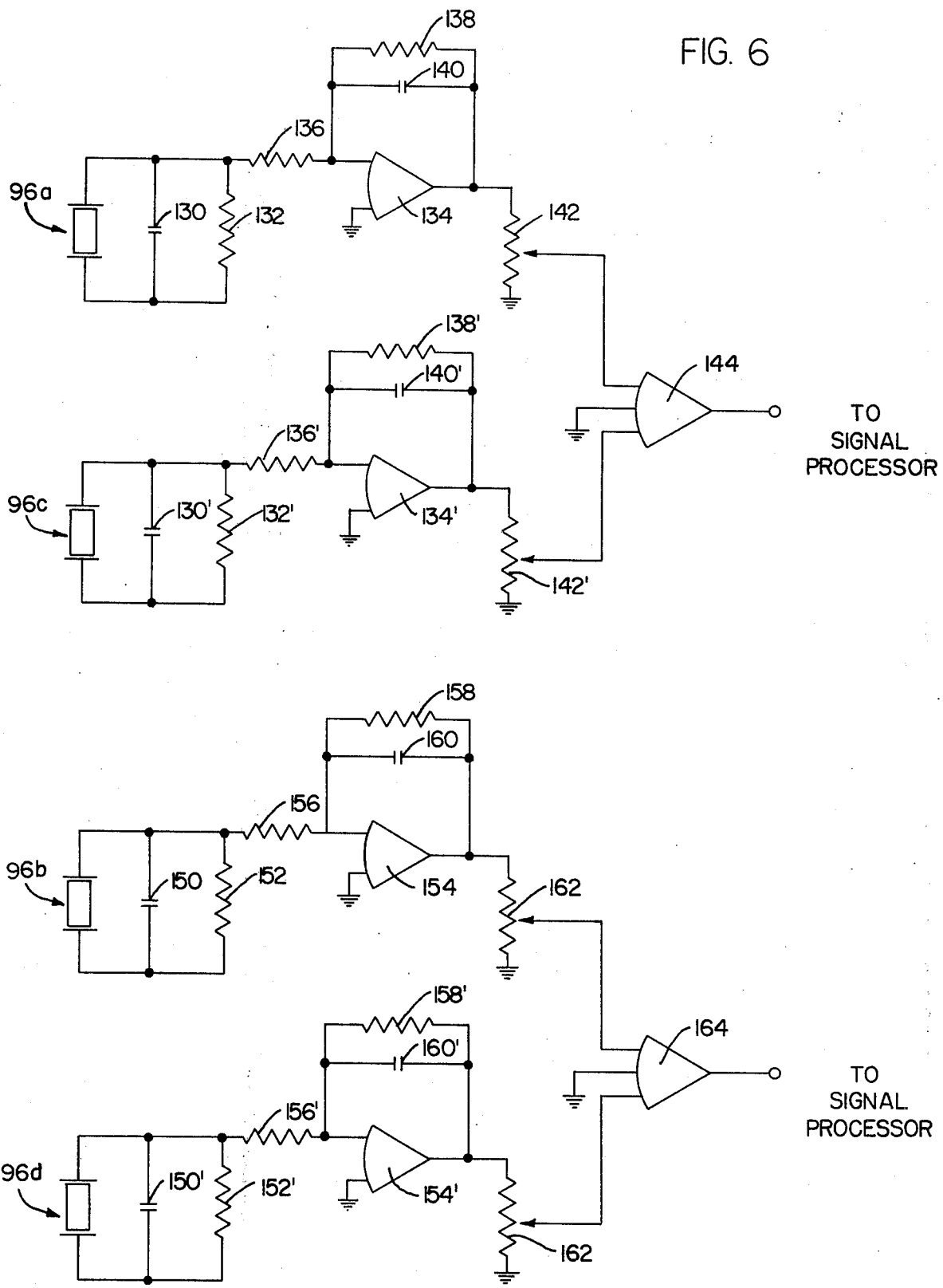
FIG. 6 is an electrical circuit diagram showing an arrangement suitable for cancelling bearing distortion and indicating the dynamic load placed on the bearing or bushing by the mechanism.

As was discussed above, the bearing or bushing is preferably constructed of strong material. It should be pointed out, however, no matter how stiff or strong a bearing is designed it will distort a very minute amount due to the forces applied thereto. With this in mind attention is directed now to FIG. 6, where there is shown a unique electrical circuitry designed for measuring low and high harmonic forces and having the capability of electronically cancelling bearing distortion. The pairs or sets of piezoelectric transducer assemblies are schematically represented in FIG. 6 as 96a, 96c comprising one set and 96b, 96d comprising the second set. Each piezoelectric transducer assembly, namely 96a, 96b, 96c, and 96d is individually connected to a part of a unique electrical circuit. The transducer assembly set comprised of 96a and 96c as well as the transducer assembly set 96b and 96d are electrically connected to a plurality of charged amplifiers which have the desired low and high frequency response characteristics. The charge amplifiers associated with the transducer assemblies 96a, 96c, and 96b, 96d, which have a low frequency response is comprised of capacitors 130, 130' and 150, 150' respectively. These capacitors are connected in parallel with resistors 136, 136' and 156 and 156'. The charge amplifiers with the desired high frequency response characteristic is comprised of the resistors 136, 136' and 156, 156'. The charge amplifiers with the desired high frequency response characteristic is comprised of the resistors 138, 138' and 158, 158' both of which are connected in parallel with the capacitors 140, 140' and 160, 160' respectively. The resistors 138, 138' and 158, 158' along with the capacitors 140, 140' and 160, 160' also serve to control the input signal to a FET operational amplifiers 134, 134' and 154, 154'. The resistors 132, 132' and 152, 152' are provided to draw any small amount of leakage resulting from the FET operational amplifiers 134, 134' and 154, 154' in order that such leaking voltage does not charge the capacitors 130, 130' or 150, 150'. Since each piezoelectric crystal may be slightly different, potentiometers 142, 142' and 162, 162' are provided for decreasing or increasing, as may be necessary the voltage per pound of force created by the piezoelectric crystal. Receiving current from potentiometers 142, 142' and 162, 162' are differential amplifier means 144 and 164. The output of the differential amplifier means 144 and 164 is then fed to a signal processor the output of which is produced on the face of an oscilliscope in wave form. It should be noted that the piezoelectric transducer assembly sets combine to produce a single output the readout of which at any given time is a summation of the dynamic loads applied in a single plane while the output generated by the deformation of the bearing is taken into account and is cancelled in a manner which will hereinafter be described.

Upon operation of the device the shaft 22 is rotated. As shaft 22 is rotated it causes the dynamic load generating means to rotate. Because of the improperly balanced body, namely the dynamic load generating means 70, being rotated the previously mentioned outwardly directed imbalance force vector causes the shaft to ride on the inside diameter of the bearing. It is when inertia forces of the driven member 82 reverse direction that the shaft 22 will be forceably driven across the oil clearance of the thin walled bearing 18 thereby slamming into the bearing creating impact forces thereupon. Therefore, not only the forces caused by the imbalance of the dynamic load generating means 70 are placed upon the thin walled bearing but additional impact forces are also imposed onto the thin walled bearing 18. The means by which the dynamic loads are measured and analyzed will now be described. As was mentioned above, and as is obvious from FIG. 1, the four piezoelectric transducer assemblies 96a, 96b, 96c, and 96d totally support the thin walled bearing or bushing 18. By this design any movement of the shaft caused by the imbalance force vector or by the shaft moving across the bearing oil clearance due to the reversal of the driven member 82 will be detected by the piezoelectric transducer assemblies. Movement of the thin walled bearing in one direction wil therefore cause compression and tension in at least one pair or set of piezoelectric transducers. For purposes of this description, assume that the dynamic load vector totally directs a compressive vertical force upon the piezolectric transducer assembly 96a. As viewed in FIG. 4 and in keeping with the natural characteristic of piezoelectric crystals the compression of piezoelectric crystal 106 will cause a voltage to be created at the conducting electrode 104. The second electrode 108 is connected to ground to complete the circuit. Turning again to FIG. 1, it can be seen that because of the vertical compressive force placed upon the bearing 18 vertical elliptical distortion of the bearing will take place. Due to the elliptical distortion of the bearing tensile stresses will be applied to the crystals imbedded within the pair of transducer assemblies 96b and 96d. This is due to the fact that those crystals are under compressive stress due to the preload stress that is equally applied to each, and when the bearing distorts the stress of the crystals is relaxed placing them in a state of tension. Tensile stress will also be placed on the piezoelectric crystal located within the trandsducer assembly 96c that is the upwardly directed force on the bearing will cause the bearing to move upwards thereby instilling upon the crystal 96c a state of tension. The polarity of the electrical charges will differ from one another since one of the crystals 96a is in compression and the other piezoelectric crystals 96b, 96c and 96d are in tensile stress, the sign of each depending upon the polarity of the crystal. The elliptical distortion of the thin walled bearing is cancelled using a unique electronic cancellation technique whereby the readout of the signal processor at any given time is a summation of only those forces applied to the bearing in a single plane.

As was stated earlier, the force that is applied to the piezoelectric transducer assembly 96a causes a voltage to be produced by the piezoelectric crystal imbedded therein. At the same time, a voltage or charge is produced at the piezoelectric transducer assembly 96c due to the tensile stresses placed upon the crystal imbedded therein. That is, the tensile stress placed upon the crystal in the assembly 96c will develop a charge that will be of a different sign from that of the charge produced by the assembly 96a. The two voltages produced at the transducer assemblies 96a and 96c are fed through the electrical circuitry as described above and shown in FIG. 6. When the voltages produced by the transducer assemblies 96a and 96c reach the differential amplifier 144 they are subtracted. In subtracting voltages of different signs the effect of the subtraction is to change the sign of the quantity to be subtracted and then combine 1 the two signals as if they were to be added. After combining the two signals within the differential amplifier a single output is produced therefrom which is representative of the dynamic load applied in the vertical plane. The net result of the differential amplifier is then fed to a signal processor thereby a particular range of frequencies may be analyzed and fed to an oscilliscope thereby yielding a visual display of the force in wave form.

As was stated earlier, there is also a voltage produced by the piezoelectric transducer assemblies 96b and 96d due to the elliptical distortion of the bearing. Due to the dynamic load being totally directed towards the transducer assembly 96a there will be no other forces placed upon the assemblies 96b and 96d except for those tensile forces created by the distortion of the bearing. It can now be seen how the distortion of the bearing is cancelled. The voltages produced by the piezoelectric transducer assemblies 96b and 96d are equal in magnitude and are the same sign. As may be best seen in FIG. 6 the piezoelectric transducer assemblies 96b and 96d are also connected to an electrical circuity described above. The voltages produced at the piezoelectric transducer assemblies 96b and 96d are fed through their respective electrical circuitry. When the voltages produced at the transducer assemblies 96b and 96d reach the differential amplifier associated therewith they are then subtracted. In the subtraction the sign of one voltage or charge is changed, so that the voltages are now of different signs. The voltages are then added whereby complete cancellation of bearing distortion occurs due to the difference in the two signs. The output of the differential amplifier 164 associated with the piezoelectric transducer assemblies 96b and 96d is therefore zero whereby distortion of the bearing is electronically cancelled. By completely cancelling the distortion of the bearing the readout of the signal processor at any given time will yield a true reading of the dynamic load that is applied in a single plane. That is, the vertical force that is totally directed against the assembly 96a will be shown as a wave on the oscilliscope which represents only those forces that are applied in the vertical plane due to the dynamic load that is applied to the bearing upon revolution, oscillation, or translation of the shaft.

As the shaft continues to rotate, and assuming rotation to be in a clockwise direction, the dynamic load will eventually totally direct a compressive force upon the piezoelectric transducer assembly 96d. Turning to FIG. 1, it can be seen that because of the now horizontal compressive force placed upon the thin walled bearing 18 horizontal elliptical distortion of the bearing will take place. Due to this elliptical distortion of the bearing tensile stresses will be applied to those crystals imbedded within the pair of transducer assemblies 96a and 96c. That is, a complete reversal of the situation stated above takes place. Whereas in the previously mentioned situation the dynamic load which was totally directed in the vertical plane was measured. Whereas in this instance the dynamic load totally directed in the horizontal plane will be measured whereby the distortion of the bearing in both instances has been taken into account and completely cancelled. By cancelling of the bearing distortion a true reading of only the dynamic load applied to the bearing may be measured. Due to the horizontal dynamic load totally directing a compressive force on the bearing compression of the assembly 96d will create a voltage. Because of the horizontal force placed upon the bearing horizontal elliptical distortion of the bearing will take place. Due to this elliptical distortion assemblies 96a and 96c will be placed in tensile stress for the reasons discussed above. Tensile stress will also be created within the assembly 96b due to the movement of the bearing by the dynamic load. Once again the polarity of the charges produced by the assemblies 96a, 96b, and 96c will differ from the polarity of the charge produced by the assembly 96d. The two voltages produced at the transducer assemblies 96b and 96d are fed through the electrical circuitry described above. When the voltages produced by the assemblies 96a and 96c reach their respective differential amplifier 164 they are subtracted the net result of the differential amplifier is then fed to the signal processor. The voltages produced by the assemblies 96a and 96c as a result of bearing deformation will be fed through their respective circuitry as described above and fed to the signal processor. Because of those two voltages being of the same sign they are electrically cancelled and therefore the output produced by the assemblies 96a and 96c will be zero. By completely cancelling the horizontal distortion of the bearing the readout of the signal processor will be reflective of only the dynamic load applied totally in the horizontal direction and will not be reflective of the bearing distortion since this has been completely cancelled. Thus it may be seen that a reversal of roles of the piezoelectric crystals takes place as the shaft rotates.

As the shaft moves across the bearing oil clearance a tangential or torsional force is applied to the bearing which attempts to turn the bearing within the support housing. The effect of this force upon the piezoelectric transducer assembly will be small because the crystals associated with the assembly have a small sensitivity to shear type forces. This transverse sensitivity of the piezoelectric crystals is cancelled in the exact same manner as is the bearing deformation. It should be appreciated that both bearing deformation and the transverse sensitivity of the crystals are taken into account whereby yielding a true reading of the load applied to the bearing.

From the above description it should be apparent that no matter in what direction the dynamic load is focused the readout of the signal processor will at any given time be reflective of the summation of forces that are applied in a single plane and that cancellation of bearing distortion will be accounted for. If it should happen that the dynamic load applied to a bearing or bushing does not lie directly in a horizontal or vertical plane then the X and Y components of that dynamic load are picked up by both the transducer assemblies recording dynamic load in the vertical plane as well as the transducer assemblies recording dynamic loads in the horizontal plane. The X and Y components of the dynamic load are then fed through the electrical circuitry as described above and the readout of the signal processor will not show an indication of bearing distortion, that is the bearing distortion has been taken into account and cancelled thereby leaving the readout of the signal processor to be reflective of the summation of forces that are applied to the piezoelectric transducer assemblies.

It should be pointed out that the present invention could be utilized in a plurality of support members located throughout the machine whereby those forces produced at each support member could be calculated all at the same time. In this manner it would be possible to locate and rank those bearings which produce the most noise.

It is apparent that there has been provided, in accordance with the invention a piezoelectric bearing transducer assembly that fully satisfies the objects, aims, and advantages set forth above. While the invention has been described in conjunction with specific embodiments thereof, it is evident that many alternatives, modifications, and variations will be apparent to those skilled in the art in light of the foregoing description. Accordingly it is intended to embrace all such alternatives, modifications, and variations as fall within the spirit and broad scope of the appended claims.

What is claimed:

1. An apparatus for measuring dynamic load applied to a bearing means by a dynamic load generating means, said apparatus comprising:
    a support member;
    a plurality of transducer assembly means mounted between said support member and said bearing means for detecting dynamic loads applied to said bearing means;
    means carried within said transducer assembly means for converting said dynamic loads into a voltage that is proportional to the dynamic load applied to said bearing means;

means connected to said transducer assembly means for cancelling spurious output caused by bearing means deformation; and means connected to said transducer assembly means for measuring both low and high harmonics of said voltage.

2. An apparatus for measuring dynamic load applied to a thin walled bearing means by a dynamic load generating means, said apparatus comprising:
a support member;
a plurality of piezoelectric transducer assembly means mounted between said support member and said bearing means for detecting dynamic loads applied to said bearing means;
means carried within said transducer assembly means for converting said dynamic loads into a voltage that is proportional to the dynamic load applied to said bearing means;
means connected to said transducer assembly means for cancelling spurious output caused by bearing means deformation; and
means connected to said transducer assembly means for measuring both low and high harmonics of said voltage.

3. An apparatus according to claim 2 wherein the range of said measuring voltage is from a first harmonic to 500 harmonics above the fundamental machine frequency.

4. An apparatus according to claim 2 wherein said bearing means has a plurality of flat surfaces on its periphery; and
said flat surfaces are disposed 90° apart.

5. An apparatus according to claim 2 wherein said piezoelectric transducer means are constantly stressed.

6. An apparatus according to claim 2 wherein said piezoelectric transducer assembly means cooperate in pairs.

7. An apparatus according to claim 6 wherein said pairs of piezoelectric transducer assemblies are circumferentially spaced apart 180° from one another and each transducer is spaced 90° from the other.

8. An apparatus for measuring dynamic load applied to bearing means by a shaft journaled within said bearing, said apparatus comprising:
a supporting means;
said bearing means carried within said supporting means;
a first and second piezoelectric transducer set means totally supporting said bearing means and said shaft, said first transducer set means detecting dynamic forces applied to said bearing means in the X-axis plane, said second transducer set means detecting dynamic forces applied to said bearing means in the Y-axis plane;
piezoelectric crystal means carried within said transducer set means whereby converting the dynamic forces applied to said bearing means into alternating electrical currents; and electrical circuitry connected to said first and second transducer set means for cancelling the transverse sensitivity of said transducer assembly means and for cancelling voltage produced by bearing distortion in a given plane and measuring a substantial frequency range of forces in a linear fashion.

9. An apparatus according to claim 8 wherein said frequency range is from 10 Hertz to 10,000 Hertz.

10. An apparatus according to claim 8 wherein said electrical circuitry is comprised of:
a plurality of charge amplifier means connected to said transducer means having low and high frequency cut-offs;
at least 4 potentiometer means connected to said charge amplifiers for adjusting the output voltage of the transducer means;
at least 2 differential amplifiers connected to said potentiometer means for subtracting the voltages whereby each differential amplifier yields a single output representative of the force applied to the electrically connected transducer means; and
electronic recording means receiving voltage from the differential amplifier means for yielding a visual display of the forces applied to the bearing.

11. An apparatus according to claim 8 wherein one set of piezoelectric transducer means is comprised of:
at least 2 piezoelectric crystals electronically responsive to stresses placed thereupon;
a plurality of conductive tab means positioned above and below said crystal for connecting said crystal to said electrical circuitry;
a plurality of insulating means positioned on either side of said conductive tabs whereby insulating said conductive tabs from said shaft and said support member;
means associated with said support member for applying a compressive force to said crystal; and
force alignment means positioned between said crystal and said compressive means allowing for a degree misalignment between said bearing and said compressive means.

12. An apparatus according to claim 11 wherein said compressive force has a magnitude which is a function of the forces applied to said bearing by said shaft.

13. An apparatus according to claim 11 wherein said force alignment means is comprised of:
shoe means positioned above said piezoelectric crystal, said shoe means having a lower flat surface positioned towards said crystal and an upper convex surface away from said crystal; and
compressive screw means threadably engaged with said support member having an extended lower portion with a concave surface associating with said convex surface on said shoe means whereby allowing a degree of misalignment between said compressive screw means and said crystal.

* * * * *